United States

Maurer et al.

4,249,163

Feb. 3, 1981

[54] AUTOMATIC MONEY DISPENSER AND METHOD

[75] Inventors: Thomas Maurer; Helmut Groettrup; Harald Helmrich, all of Munich, Fed. Rep. of Germany

[73] Assignee: G.A.O. Gesellschaft für Automation und Organisation mbH, Fed. Rep. of Germany

[21] Appl. No.: 36,737

[22] Filed: May 7, 1979

Related U.S. Application Data

[63] Continuation-in-part of Ser. No. 834,900, Sep. 20, 1977, abandoned.

[30] Foreign Application Priority Data

Sep. 29, 1976 [AT] Austria ................... 7226/76

[51] Int. Cl.³ ................. H04Q 9/00; G06K 5/00; G06F 7/00
[52] U.S. Cl. ................ 340/149 A; 235/379; 235/381
[58] Field of Search .............. 340/149 A; 235/379, 235/381

[56] References Cited

U.S. PATENT DOCUMENTS

| | | | |
|---|---|---|---|
| 3,941,977 | 3/1976 | Yoss et al. | 340/149 A |
| 3,956,615 | 5/1976 | Anderson et al. | 340/149 A |
| 3,985,998 | 10/1976 | Crafton | 340/149 A |
| 4,114,027 | 9/1978 | Slater et al. | 340/149 A |

*Primary Examiner*—Donald J. Yusko
*Attorney, Agent, or Firm*—McGlew and Tuttle

[57] ABSTRACT

The dispenser is operable with an identification card carrying all data necessary for dispensing of money, and either a code number or a check, also carrying all data necessary for dispensing of money, and the dispenser is connected to a central computer having access to all data relative to a dispensation of money. The card contains automatically readable information identifying the issuing bank and, when the card is inserted into the dispenser, it is checked for authenticity in a card check and is read in a reading station, the card check and the reading station supplying outputs to a control unit and the reading station supplying an output to a comparator and an outout to blocked accounts store. The card then passes through an on-off line reading station, whose output is connected to the control unit, and to a gate station where the card is temporarily retained. Responsive to the inputs thereto, the control unit activates a display to advise the customer whether money can be dispensed either responsive to insertion of only a check carrying all data necessary for dispensing of money, or only punching of a customer's code number into a keyboard, or whether money can be dispensed only responsive to insertion of the check.

10 Claims, 3 Drawing Figures

AUTOMATIC MONEY DISPENSER AND METHOD

CROSS-REFERENCE TO RELATED APPLICATIONS

This is a continuation-in-part of application Ser. No. 834,900 filed Sept. 20, 1977 and now abandoned.

FIELD AND BACKGROUND OF THE INVENTION

The present invention relates to an automatic money dispenser (AMD) operable with an identification card and a code word or a check.

German printed patent application (DT-AS) No. 2,020,031 discloses an on-line AMD wherein the customer's account card is used as an identification card. After insertion of the account card, input of the code number by hand, and a positive check of the entered data with the information stored in a central computer, data can be input as to whether and to what amount is to be paid out or in.

Since in the case of on-line AMD's the entered data can be checked very accurately by means of the central computer, and even very short-term changes in account balance can be immediately allowed for at all automatic dispensers to be operated, any unauthorized withdrawal or overdraft can be prevented relatively well despite the automatic dispensation of money.

During night hours as well as on Sundays and public holidays, the central computers are frequently switched off because of the reduced effective time of the computers, so the AMD's are operated in the off-line mode, which is less advantageous for the on-line AMD. As a result, the banks run a less well calculable risk. In addition, the use of account cards as identification cards permits only the customers of the bank operating the AMD (direct customers) to pay in or withdraw money. Noncustomers of the bank (indirect customers) are unable to use the AMD.

German published patent application (DT-OS) No. 2,302,020 discloses an AMD which can be continuously operated off-line at a consistently small risk with an identification card and the input of a document, e.g. a check. The identification cards and checks have particular safety marks which are checked in the dispenser for agreement and genuineness. In this case, the use of supranational identification cards and checks makes it possible for both direct and indirect customers to use the AMD, but this involves, for both customers, the inconvenience of entering a document instead of keying-in a code number, which is frequently preferred. This reference is incorporated by reference to show portions of the invention that are known per se.

SUMMARY OF THE INVENTION

It is therefore the object of the invention to improve the above-described identification card and document-operated AMD so that it can be used by both direct and indirect customers with input means specially suited to the customer, without any additional operating steps having to be taken by the customer.

The automatic money dispenser operates with an identification card and a code number or a check, and is characterized in that the identification card contains automatically readable information which identifies the issuing bank and is checked in the automatic dispenser by means of suitable checking devices. Depending on whether or not the customer banks with the bank, and whether or not central computer connected to the money dispenser is in an operable condition, the operated automatic dispenser determines whether or not dispensation of money is possible with the card and either a code number or a check, or only with a card and a check. This determination is displayed to the customer for corresponding operation of the automatic dispenser.

The present invention has the advantage that, despite uniform operation of the AMD, a sequence tailored to the respective customer takes place in the AMD, and that nevertheless optimum safety is guaranteed for the respective bank. The operation of the AMD is independent of the place of installation and the time of day because the respective suitable sequence is selected inside the dispenser, so it is not necessary to exclude certain customers, and the dispenser is usable at all times. By simple means, the direct customer is offerred the alternative of operating the dispenser with a check or a code word, whereby, in spite of great operating convenience and freedom of use, a balanced proportion to the risk of the bank is maintained.

For an understanding of the principles of the invention, reference is made to the following description of a typical embodiment thereof as illustrated in the accompanying drawing.

DESCRIPTION OF THE PREFERRED EMBODIMENT

Figure 1:
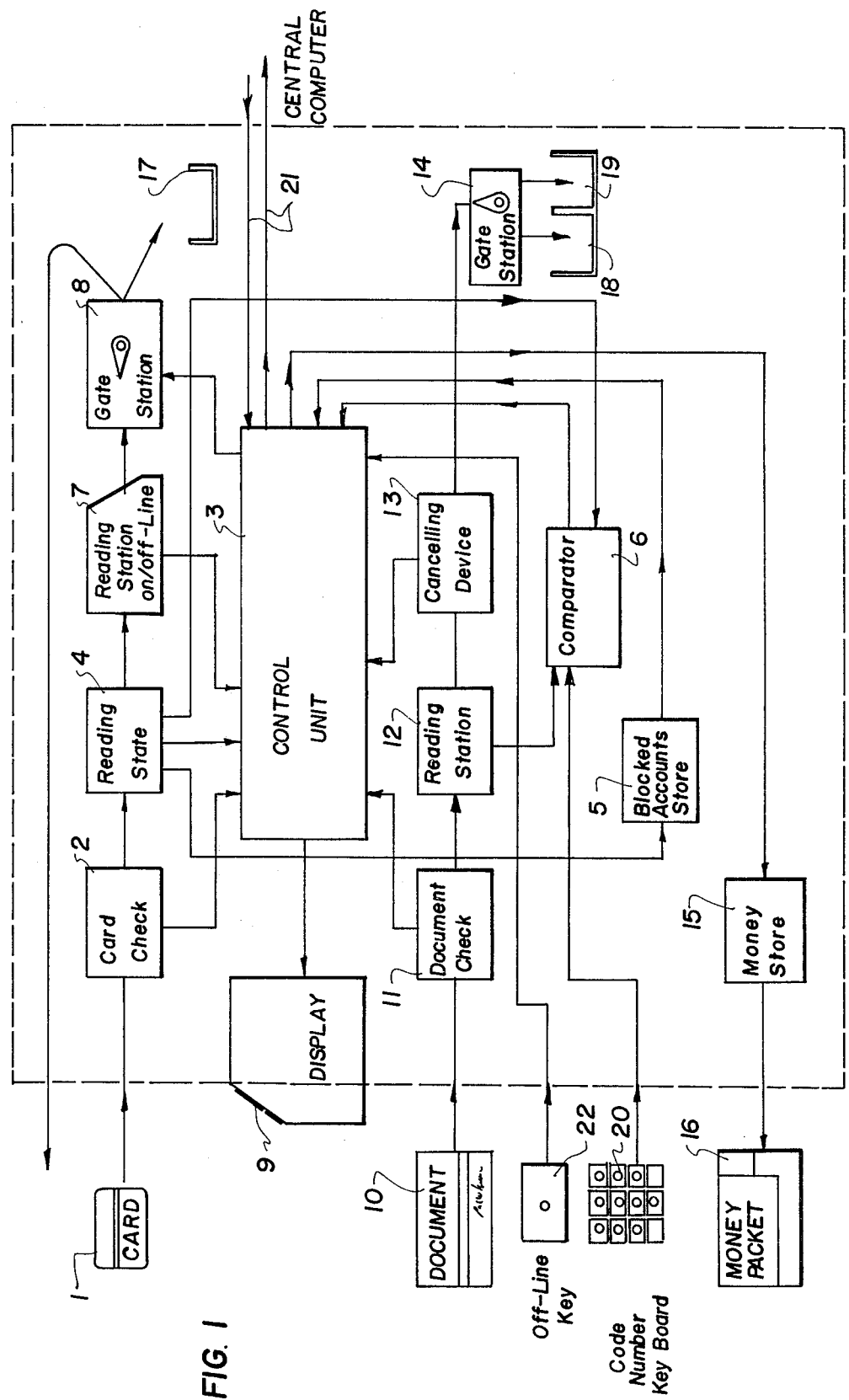
FIG. 1 is a block diagram of the automatic money dispenser in accordance with the invention.

Prior to the description of the sequence of operation, a few assumptions are made for a clear delimitation. It will be assumed, in principle, that the desired AMD has been installed by a supraregional credit institution where several branches of a town or area are connected via data lines to a central computer which is ready for operation at any time at least in the daytime. The central computer must have access to all data relevant to a dispensation of money (e.g. account balance, credit limit, etc.). The direct customers of the credit institution, who have an account with any branch within the town or area, are to be able to operate any automatic dispenser within the town or area with only the identification card and a code number known only to the customer, the so-called secret number, when he wants to have the withdrawn amount of money directly deducted from his account. In addition, the direct customers are to be able to operate the automatic money dispenser with only an identification card and a document.

For indirect customers, i.e. customers of the same credit institution from another town and customers of other credit institutions including foreigners, the automatic money dispenser is to be operable exclusively with an identification card and a document.

The identification card may be modeled in the shape and size after a universally applicable credit card, and the document after a supranational check form. The credit card and the check must carry all data necessary for a paying-out process, such as bank code number, account number, nationality mark, secret number, etc. The credit card and the check firm are not shown in detail in the drawing since they are known means.

The customer feeds the identification card 1 into the automatic money dispenser by inserting it into a slot from which it moves into a checking device 2. In this checking device 2, the identification card 1 is checked for the presence of the special marks of genuineness impressed on it. The result is stored in a control unit 3. The identification card 1 then moves on to a reading station 4 which reads the data of the identification card 1 and enters this data into the control unit 3. At the same time, the data are fed into a store 5 where the blocked accounts are recorded. The result of a comparison between the stored and read data is entered into the control unit 3. The read data are also fed into a comparator 6.

Subsequent to the reading station 4, the identification card 1 is moved into another reading station 7 where the on-off line authorization is checked, e.g. by evaluating the bank code number imposed on the identification card 1. The result of the reading is entered into the control unit 3. From the reading station 7, the identification card 1 moves into a gate station 8, where it remains until the end of the end of the implementation of other functions described below.

When an off-line authorization has been read, a display 9 indicates that a document 10 is to be entered. The document 10 is fed into the automatic money dispenser through a slot and moves into a checking device 11 where it is verified. The result is entered into the control unit 3. The document 10 then moves into a reading station 12 where its data are read. The data are also fed into the comparator 6 where the data are compared with the data of the identification card 1. The positive or negative result is entered into the control unit 3. The document 10 then moves into a gate station 14 via a cancelling device 13.

If the results of all checks are positive, the document 10 is placed into a stacker 18, and the control unit 3 send to a money store 15 a signal in response to which this store dispenses a packet of money 16 which contains an amount corresponding to that of the document 10. The control unit 3 then sets the gate 8 so that the identification card 1 is returned to the customer.

When the results of the check are negative, no money is paid out, the identification card 1 may not be returned but may be placed into a stacker 17, and the document 10 may be placed into another stacker 19.

If an on-line authorization has been read on the identification card 1, the customer is requested, via the display 9, to enter the code number into a code-number keyboard 20 connected to the comparator 6. The control unit 3 is now connected to the central computer via data lines 21, and the relevant data are transferred. After a check in the central computer with a positive result, either a fixed amount of money and the identification card 1 are dispensed as described above, or the customer is requested via the display 9 to enter the desired amount of money into the code-number keyboard 20. If a comparison with the customer's account shows that the desired sum of money is covered by the account, the sum and the identification card 1 are dispensed or an indication is provided that on-line working is not possible because the credit limit has been exceeded. In this case, it is possible for the direct customer, because of the extended credit limit, to achieve a dispensation of money by pressing an off-line key 22 and entering a document 10. If the off-line key 22 is not pressed, the identification card 1 will be returned after a fixed time delay.

If, for one reason or another, a direct customer, despite having a sufficient account, prefers to operate the automatic dispenser with an identification card and a document rather than enter a code word, he is generally able to change the on-line working to off-line working by pressing the key 22. Direct customers are thus free to choose the operative method more advantageous or convenient to them in a specific case.

With on-line working and the dispensation of fixed amounts of money, the operating sequence can be simplified and shortened at the request of the customer by dispensing several packets of money upon a single insertion of the identification card 1 if the account balance is sufficient.

The control unit 3, possible in connection with the central computer, is also equipped for the usual additional control sequences such as repetition of the code number in case of a false input, multiple checking of the identification card and the document, or premature retention of the identification card in case of attempted fraud.

If, for economical reasons, the central computer is switched off on certain days and/or at certain times of the day, or if on-line working of the automatic dispenser is impossible because of a failure of the data line, the AMD will request both the indirect and the direct dustomers, by means of appropriate operating instructions, to enter the identification card and a check. During these times, operation of the dispenser with identification card and code word is impossible for safety reasons.

At certain places of installation (airports, railway stations, on borders, etc.) it may be advisable to leave the customer the choice of different currencies. In the off-line mode, the document 10 is then printed directly with the amount of the currency chosen. In the on-line mode, which will certainly occur rarely in this case, the customer's account can immediately be debited with the respective amount in the legal currency of the country on the basis of the current rate of exchange stored in the central computer.

Especially at airports, at railway stations, or at borders, it is recommended to provide another variant with which the individual service to the customer is further improved. According to the nationalities of the customers, the display is chosen to be either in the language of the customer's country or, in the case if less common languages, in a language very similar to that of the country or in an internationally common language.

Similarly to the on-off line control of the automatic money dispenser by customer-specific card marks and/or card information, the control of the displays in different languages uses data of the identification card 1 which give information about the nationality of the card holder. In the simplest case, such information can be obtained by checking the nationality mark of the identification card 1.

The card check 2 with reading station 4 and reading on-off line station 7 and portions of control unit 3 which respond to these units comprise an identification card checking means for checking and reading the identification card 1. Document check 11 with reading station 12 and cancelling device 13 and portions of the circuitry and control unit 3 for reacting to these units comprise a document checking means for checking and reading the document. Control unit 3 includes programming means for providing plural partial dispenser operating programs which are responsive to the different conditions prevalent in the translation to control a dispenser means which comprises gate stations 8 and 14, money store 15, and a circuitry of unit 3 which activates the money store.

Figure 2:
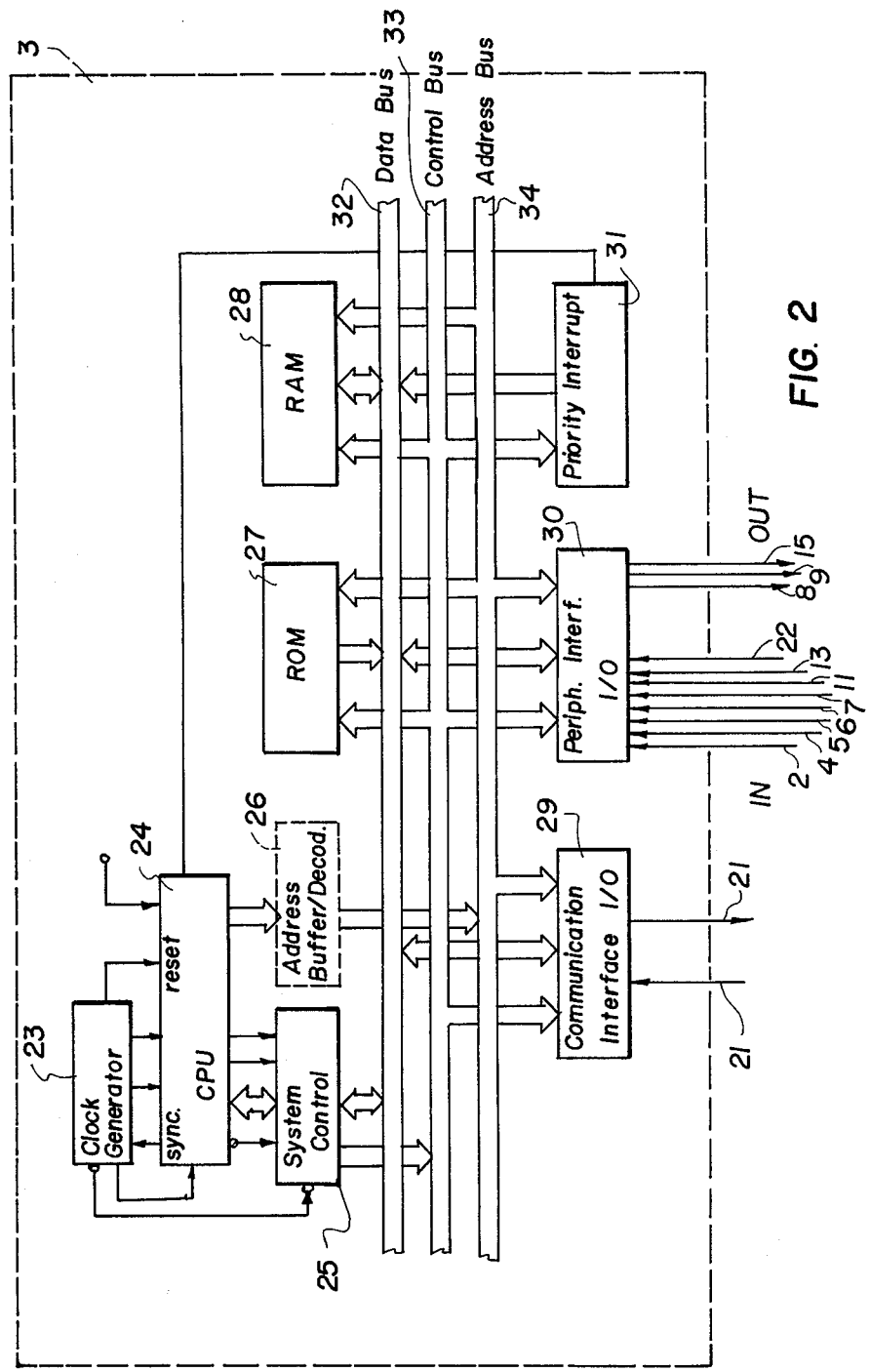
FIG. 2 is a schematic representation of the hardware and circuitry which can be used to practice the invention.

FIG. 2 shows the internal arrangement of one possible control unit 3 which, in the present example, is embodied by the "microcomputer 8080" of the Intel Company. The block diagram of the microcomputer is taken from the Intel pamphlet published in 1975. Even though the use and function are well known in the art, the application to the present on-off line dispenser is shortly described in the following:

The microprocessor system comprises a clock generator 23 in which the clock signal needed for all operations is generated and available, a central unit 24 in which all of the arithmetic and logic operations are performed and the instructions and control signals handled, a system control unit 25 in which the sequence of the instructions of the machine program is controlled and monitored, an address buffer and decoder unit in which, at the occurrence of a larger amount of data, the individual addresses are stored for recall and decoded, a programmable non-volatile memory (ROM) 27 in which the program for the dispenser operation is stored, a read/write storage (RAM) 28 in which the data occurring during a translation are temporarily stored and wherefrom they are recalled as the program is running, a communication interface 29 providing a link to the internal central computer of the bank and through which the data recalled from this internal central computer are transferred to the system, an input/output device (peripheral interface) 30 through which the micromouter system is supplied with data from (see FIG. 2) the peripheral equipment 2, 4, 5, 6, 7, 11, 13 and 22 and wherefrom instructions and data are supplied to units 8, 9 and 15, and a priority interrupt 31 wherefrom, at the occurring of important events which higher priority, the run of the program in the central unit can be interrupted or changed. The individual units can be interconnected through lines for multiple data transfer which are the data bus 32, control bus 33, and address bus 34. Human interface is achieved at devices 2 and 11, key 22, and keyboard 20 through device 6.

Figure 3:
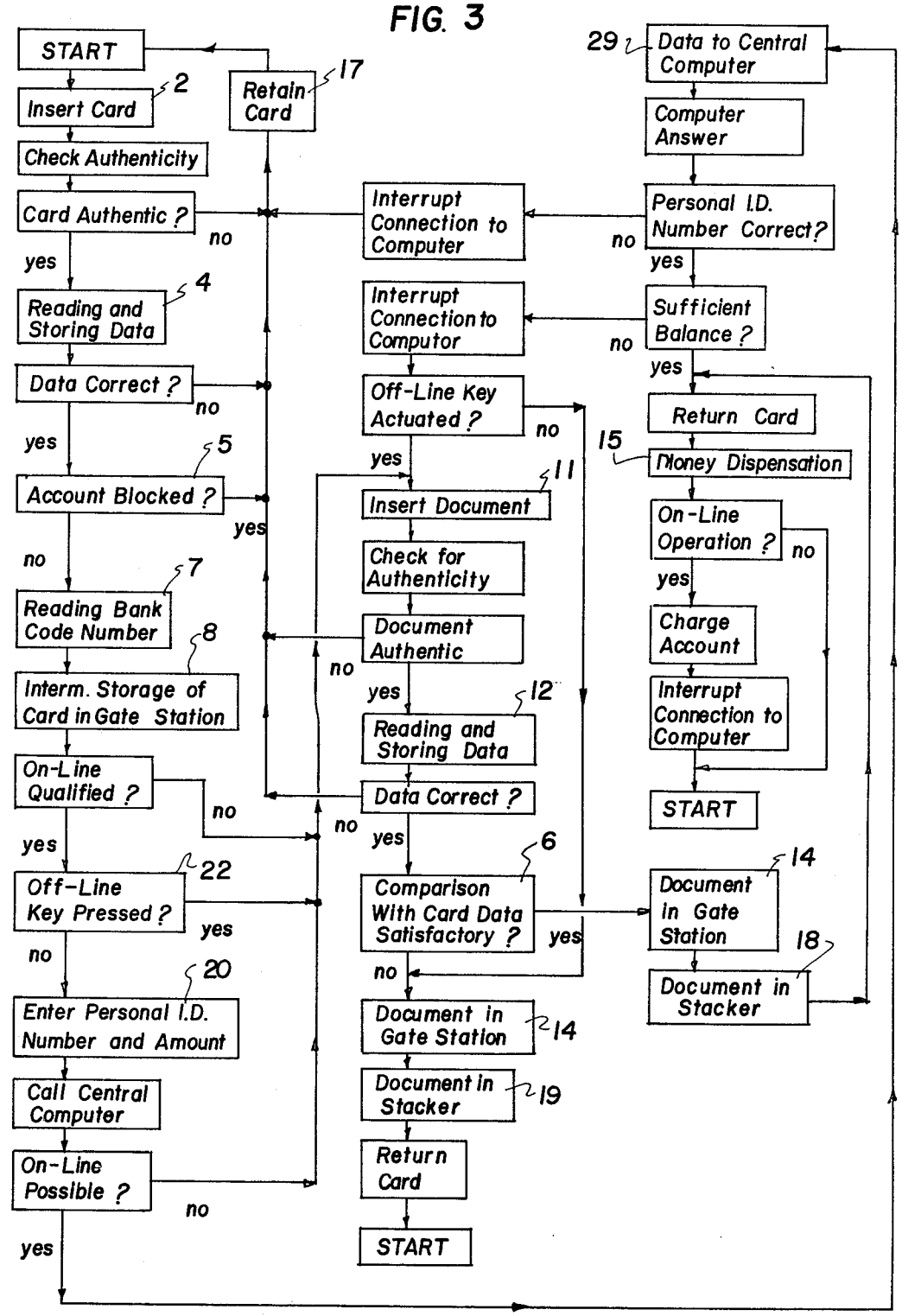
FIG. 3 is a functional flow chart of the inventive method.

FIG. 3 is a functional flow chart of the on-off line money dispenser and method of the invention. As shown in the chart, a transaction is started by inserting an identification card 1 at 2 in FIG. 1. Thereby, the program stored in control unit 3 is started and the operations provided in the program are performed in the correct sequence. Where possible the blocks of FIG. 3 are labelled with the device of FIG. 1 or 2 which performs the function. The first step is to check the card for the presence of the required authenticity features, which is done in the respective unit 2. The information on the presence of the authenticity features is transferred from unit 2 through a data channel to peripheral interface 30 and therefrom stored in memory 28. If the card carries the required authenticity marks, it is transported to reading station 4 where the general data of the card are read out and also stored in memory 28 and, in addition, in a memory of comparator 6. By means of a program stored in non-volatile memory 27, in accordance with which certain predetermined date of the card are subject to arithmetic operations and tested for predetermined arithmetic conditions, the "authenticity" of the card data stored in memory 28 is checked in central unit 24. At the same time, the data picked up from the card pass to memory 5 where the blocked accounts are stored and in which it is determined whether an account there stored is identical with the account number carried by the card. If the account number read out from the card is not stored in memory 5, the card is transported to reading station 7, to ascertain the on-off line authorization, for example, on the basis of the bank code number. The readout result is also stored in memory 28 of storage unit 3. Upon leaving reading station 7, the card is moved into a gate station 8 where it is retained until other operations, described hereinafter, are performed. If an on-line authorization has been read out of card 1, which fact is ascertained in control unit 24 by means of a program stored in non-volatile memory 27 and of data stored in memory 28, a keyboard operation is prompted through display 9, to enter the code number. Keyboard 20 is connected to comparator 6. The message in display 9 includes a prompting to press the off-line key. In control unit 3 or control unit 24, it is checked whether or not the off-line key has been actuated. If the off-line key has not been pressed, the customer is invited, by a message in display 9, to enter the code number and the desired amount of money through keyboard 20. Upon entering and storing these data in memory 28, control unit 24 calls the central computer of the bank, through communication interface 29 and data line 21. After establishing the communication with the central computer, the data necessary for the transaction and retained in memory 28 are transmitted to the central computer and all of the data stored in the central computer and needed for the transaction (for example, the account balance, a comparative code number stored in the central computer, etc.) are recalled. Now, the code number is checked for correctness in central unit 24. A positive check is followed by establishing whether the customer's balance is sufficient to cover the provided transaction. If this also issues in a positive result, the card is returned to the customer by a corresponding instruction to gate 8 from central unit 24, the desired amount of money is dispensed, the customer's account in the central computer is charged accordingly, the connection to the central computer is disconnected, and the program is reset to the start.

If, on the contrary, the checking for the on-line authorization establishes that the card user is an indirect customer, thus not qualified for the on-line mode, the customer is invited, through display 9, to insert the document. Upon the insertion, certain authenticity marks on the document are checked in checking device 11 and the result is transferred to control unit 3 or memory 28. If the result was positive, the document passes into reading station 12 where all the data necessary for the transaction are read out from the document. The read data are transmitted to comparator 6 where the data of the identification card have already been stored by means of an internal memory. In comparator 6, these data of the document are compared with the data of identification card 1. The positive or negative result of this comparison is transferred to control unit 3 or central unit 24. Document 10 is then transported through a cancelling device 13 to a gate station 14.

If all checking operations issued in a positive result, document 10 is directed to a stacker 18, in accordance with the program stored in non-volatile memory 27 of central unit 24. In addition, central unit 24 provides for returning the identification card and dispensing the requested money in the form of one or more money packets 16. Since in an off-line transaction, customer's account is not charged immediately, the program is reset right after the money dispensation.

If one of the checks was negative, no money is dispensed. In such a case, depending on the program stored in memory 27, the identification card 1 is either returned to the customer, or, upon a corresponding actuation of gate 8, deposited in a stacker 17. Independently of how the identification card is handled, the document 10 in any case is directed, preferably, into another stacker 19.

In instances where upon the insertion of an on-line qualified card and the displayed "Press Off-Line Key?" message the off-line key has been actuated or where upon calling the internal central computer of the bank, it has been found that no data transfer is possible, the insertion of a document is prompted through display 9 and the already described off-line program is started.

In cases where it has been established that the identification card or the document fails to be authentic or carries incorrect data or that the respective account is blocked, central unit 24 causes the identification card to be retained and resets the program. The entry of an incorrect code or an unsuccessfully repeated entry thereof has the same effect and, in addition, interrupts the connection to the internal central computer of the bank. On the other hand, if it is established in central unit 24 that the customer's balance does not cover the requested amount, the connection to the central computer is also interrupted, but the off-line mode alternative gives the customer the opportunity, upon the display "Insert Document" and by starting the off-line program described above, to get the requested money dispensed.

While a specific embodiment of the invention has been shown and described in detail to illustrate the application of the principles of the invention, it will be understood that the invention may be embodied otherwise without departing from such principles.

What is claimed is:

1. In an automatic money dispenser, operable with an identification card and either a code number or a check, connected to a bank central computer having access to all data about customers of the bank relavant to a dispensation of money, the improvement comprising: in combination, an identification card containing automatically readable information identifying whether the data of the customer are stored in the control computer carrying all data necessary for dispensing of money, checking means in said dispenser operable to read said automatically readable information and verify completeness and genuiness of said information, said checking means responsive to insertion of said identification card into said dispenser by a customer; control means in said dispenser responsive to such reading and verifying, responsive to whether or not the central computer is in an operable condition, and responsive to whether the data on the customer are stored in the central computer, operable to determine whether or not dispensation of money from said dispenser is possible with said identification card and with a customer code number or with said identification card and a check carrying all data necessary for dispensing of money, dispensation of money being possible, if the data on the customer are stored in the control computer, the central computer is in an operable condition, the card information is verified and the code number is used, or, when the central computer is inoperable or the data on the customer are not stored in the central computer, if the card information is verified and the check is used; and display means operable, responsive to said determination, to display the determination to the customer for corresponding operation of said dispenser.

2. In an automatic money dispenser, the improvement claimed in claim 1, including means in said dispenser operable to read a bank code number on said card for identification of the issuing bank of the central computer.

3. In an automatic money dispenser, the improvement claimed in claim 2, in which said checking means comprising checking devices operable, when said automatic money dispenser is operatively connected to an operable computer of said issuing bank through data lines, to make possible dispensation of money, for customers of the issuing bank, with said identification card and a code number and to make possible, for customers of other banks, dispensation of money with said identification card and a check, said display means displaying a corresponding information to the customer responsive to insertion of an identification card into the automatic money dispenser.

4. In an automatic money dispenser, the improvement claimed in claim 2, including keying-in means, said keying means being operable, by an instruction keyed thereinto by a customer of the issuing bank inserting an identification card into said automatic money dispenser, to change operation of said automatic money dispenser by code number into operation by a check.

5. In an automatic money dispenser, the improvement claimed in claim 2, in which said checking means comprises checking devices operable, when said computer is in an inoperable condition, to permit dispensation of money for customers of said issuing bank and for customers of other banks, using an identification card and a check; said display means displaying corresponding information to the customers.

6. An automatic money dispenser, operable with an information carrying identification card, along with either a personal identification number or an information-carrying document, comprising; in combination, card checking means operable to check the information on an identification card, document checking means for checking the information on a document, key loaded means for inputing the identification number, an off-in key operable to disconnect the dispenser from a central computer, and money dispenser means for dispensing money; program means providing plural partial dispenser operating programs connected to said card and document checking means and to said dispenser means; means operable responsive to such information checking to set up, from said partial dispenser operating programs, an individual program sequence in correspondence with the checked information, and means operable to effect operation of said money dispenser in accordance with said individual sequence, the identification card carrying information characterizing the issuing bank, and said checking means operable to check the information characterizing the issuing bank; means operable to connect said dispenser to a central computer; a control unit in said automatic money dispenser operable, in dependence on the bank connection of the customer using the identification card and the operational readiness of the central computer, to determine whether dispensation money is possible with the identification card and one of a code number and a check, or only with the identification card and a check; and display means operable to display to the customer, such determination for corresponding operation of said automatic money dispenser.

7. An automatic money dispenser, as claimed in claim 6, including a reading station in said automatic money dispenser operable to read a code number of an issuing bank provided on the identification card, to identify the banking connection of the customer using the identification card.

8. An automatic money dispenser, as claimed in claim 7, including data lines operable to connect said automatic money dispenser to a central computer of the bank issuing the identification card; said checking devices functioning, responsive to connection of said automatic money dispenser through said data lines to the central computer and when the central computer is ready for operation, to make possible money dispensation, for customers of the bank issuing the identification card, using the identification card and said code number, and to make possible, for customers of other banks, dispensation of money with an identification card and a check; and display means operable to indicate, to a customer, which dispensation mode can be used.

9. An automatic money dispenser, as claimed in claim 8, including a manually operable key which, upon actuation by a customer, changes the operation of said automatic money dispenser from an operation responsive to said code number into an operation responsive to insertion of a check.

10. An automatic money dispenser, as claimed in claim 7, in which said checking means functions, when the central computer is not ready for operation, to make possible money dispensation to customers of the bank issuing the identification card and to other customers using the identification card and a check; said display means advising a customer by a corresponding display.

* * * * *